United States Patent [19]

Morrow, Sr.

[11] Patent Number: 4,625,512

[45] Date of Patent: Dec. 2, 1986

[54] SINGLE STAGE, TWIN VALVE, VARIABLE TORQUE CONVERTER

[75] Inventor: James G. Morrow, Sr., Manitowoc, Wis.

[73] Assignee: The Manitowoc Company, Inc., Manitowoc, Wis.

[21] Appl. No.: 823,829

[22] Filed: Jan. 29, 1986

Related U.S. Application Data

[63] Continuation of Ser. No. 694,893, Jan. 24, 1985, abandoned, which is a continuation of Ser. No. 392,565, Jun. 28, 1982, abandoned.

[51] Int. Cl.$^4$ .............................................. F16D 33/02
[52] U.S. Cl. ......................................... 60/353; 60/352
[58] Field of Search ................. 60/330, 331, 333, 347, 60/352, 353, 357, 367

[56] References Cited

U.S. PATENT DOCUMENTS

| | | |
|---|---|---|
| 1,283,711 | 11/1918 | Everett . |
| 1,831,770 | 11/1931 | Sinclair ................... 60/352 |
| 2,327,647 | 8/1943 | Jandasek . |
| 2,350,810 | 6/1944 | Pentz . |
| 2,434,218 | 1/1948 | Miller ..................... 60/353 |
| 2,465,739 | 3/1949 | McGill .................... 60/353 |
| 2,529,929 | 11/1950 | Foster ..................... 60/352 |
| 2,586,136 | 2/1952 | Wyndham .............. 60/352 |
| 2,683,350 | 7/1954 | Odman .................... 60/352 |
| 3,088,564 | 5/1963 | Grall et al. . |
| 3,120,896 | 2/1964 | Grall et al. . |
| 3,221,896 | 12/1965 | Grall et al. . |
| 3,335,568 | 8/1967 | Van de Hey ........... 60/352 |
| 3,376,981 | 4/1968 | Morrow . |
| 3,383,951 | 5/1968 | Morrow . |
| 4,094,143 | 6/1978 | Schlegel et al. ....... 60/352 |
| 4,128,999 | 12/1978 | Yokoyama et al. ... 60/353 |

Primary Examiner—Deborah L. Kyle
Assistant Examiner—Richard L. Klein
Attorney, Agent, or Firm—Leydig, Voit & Mayer, Ltd.

[57] ABSTRACT

A single stage, twin valve, variable torque converter has a vaned input impeller, a vaned, single stage output turbine and a twin valve all disposed in a fluid filled, generally torroid-shaped chamber of a housing. The torque converter by means of its twin valve provides a variable forward output torque for a constant input speed and also provides a low reverse torque. The twin valve consists of two connected, concentric cylindrical sleeves which can be moved axially into and out of the torroid-shaped chamber so that the first sleeve can be interposed between the vanes of the input impeller and the vanes of the output turbine and the second sleeve can surround the vanes of the output turbine and thus seal off the output turbine from the fluid within the torroid-shaped chamber of the torque converter and provide a low reverse torque.

3 Claims, 4 Drawing Figures

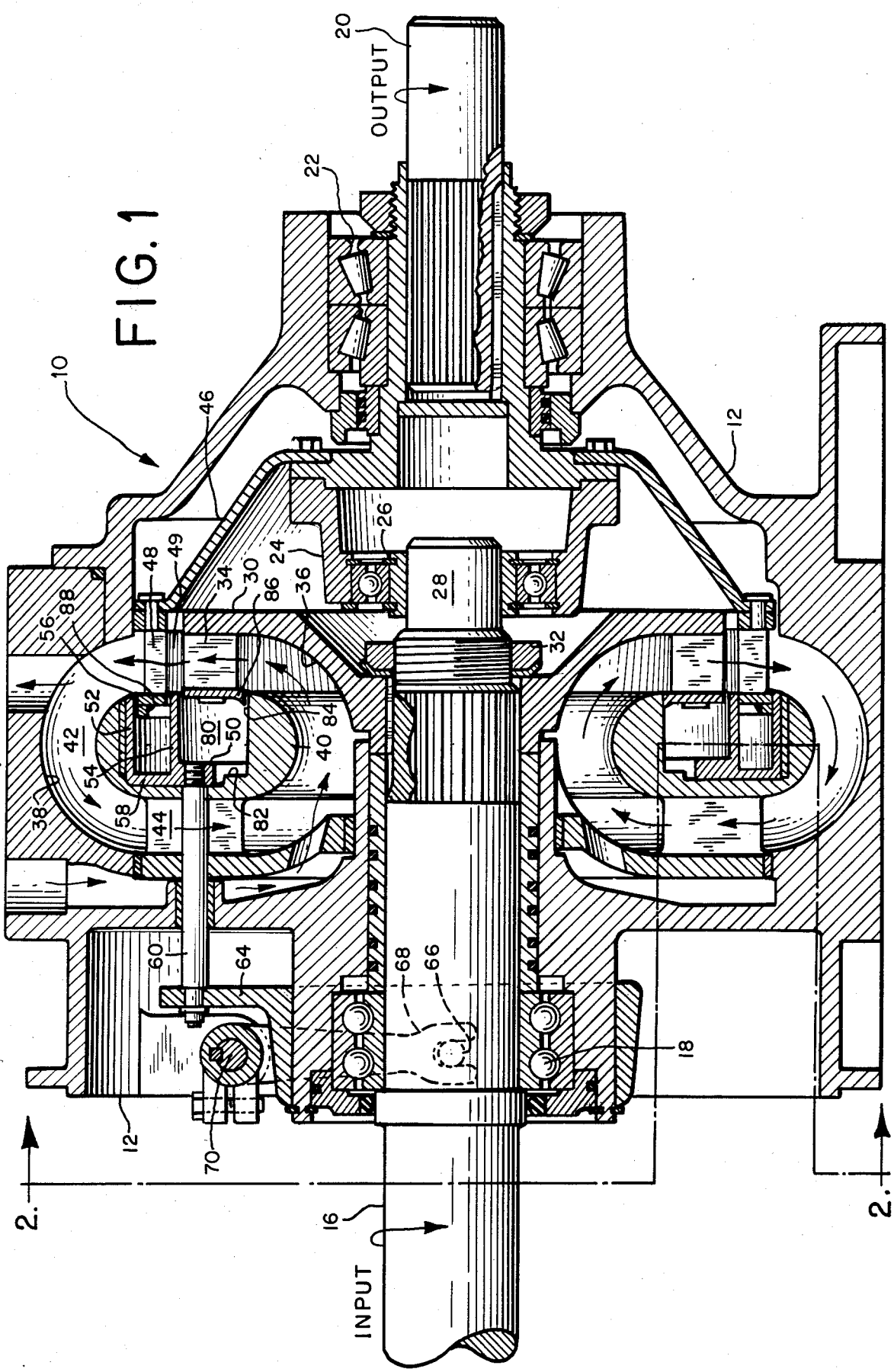

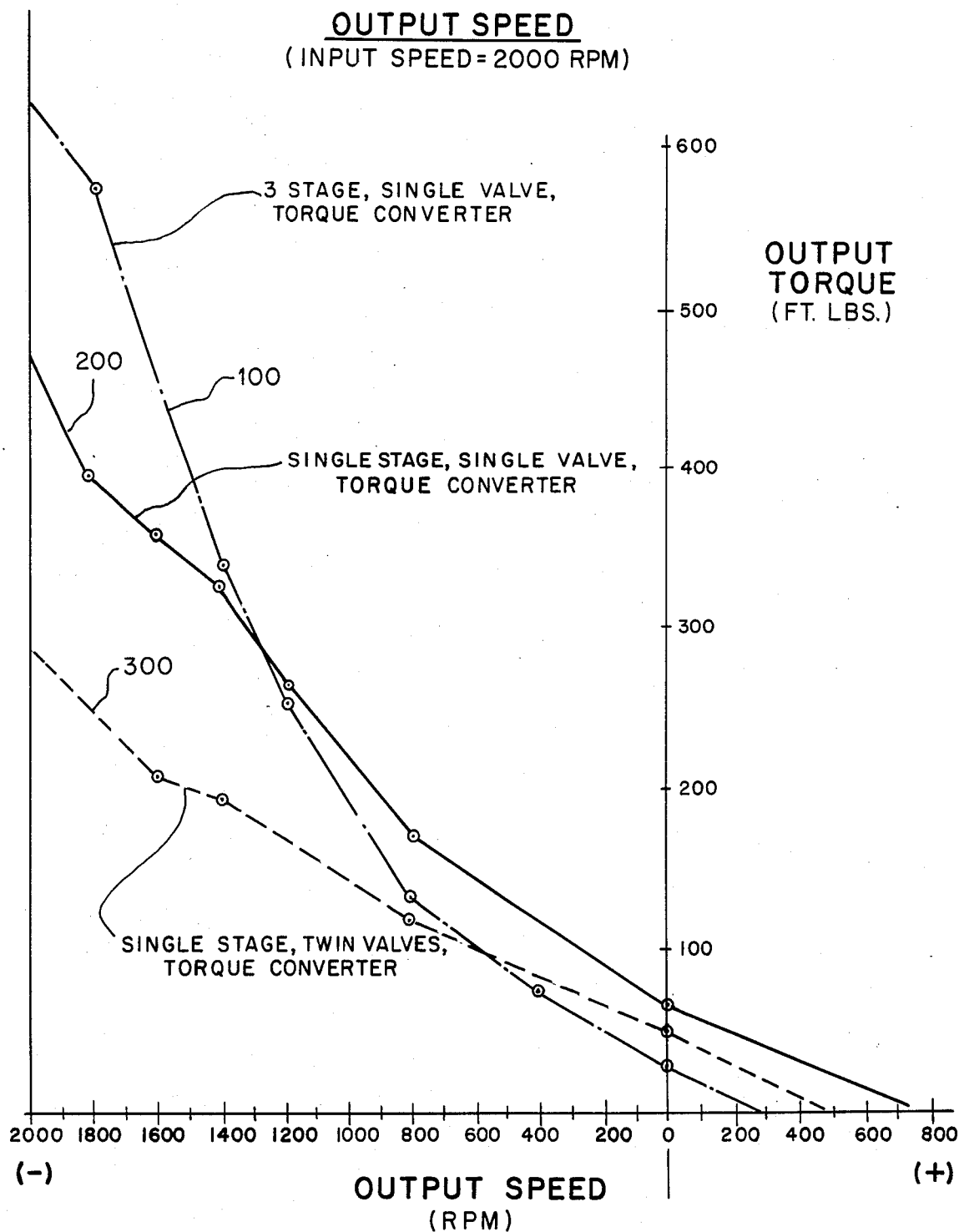

SINGLE STAGE, TWIN VALVE, VARIABLE TORQUE CONVERTER

This application is a continuation of application Ser. No. 694,893, filed Jan. 24, 1985, now abandoned, which is a continuation of application Ser. No. 392,565, filed June 28, 1982, abandoned.

BACKGROUND OF THE INVENTION

The present invention relates generally to torque converters, and particularly to a single stage, twin valve, variable torque converter, capable of converting a constant speed input to a variable, forward direction output torque and providing a low reverse direction output torque.

In machines such as heavy lift cranes and crane-type excavators (draglines), it is customary to use a constant speed engine to drive a hoist cable drum for lifting the crane's load. In crane-type excavators, it is also customary to use the same constant speed engine as well to provide power to a dragline drum for pulling the dragline attached to the crane's bucket during the excavation operation itself. Three stage, variable torque converters, such as that shown in Van De Hey, U.S. Pat. No. 3,335,568, assigned to the assignee of the present application, have been used for a number of years to convert the engine's constant speed input to a variable torque output to power the hoist cable drum and the dragline cable drum in cranes and crane-type excavators manufactured and sold by the assignee of the present invention.

In variable torque converters such as described in the Van De Hey patent, the output torque is varied by means of a single valve in the form of a cylindrical sleeve which slides axially between the vanes of the input impeller and the first stage (set of vanes) of the three stage output turbine and regulates fluid flow from the input impeller to the three stage output turbine. By controlling the flow of fluid between the impeller and the turbine, variable forward output torque is provided from a constant speed input to power the hoist cable drum and dragline cable drum of heavy lift cranes and crane-type excavators. The Van De Hey-type three stage, variable torque converter has in large part eliminated the necessity of providing mechanical friction clutches which are prone to wear and early failure in heavy lift cranes and crane-type excavators.

In crane-type excavators particularly, efficiency is achieved not only by rapid loading and hoisting of the loaded bucket, but also by rapid lowering of the empty bucket and paying out of the dragline. In order to lower the empty bucket rapidly and pay out the dragline rapidly and thus insure a rapid duty cycle, it is necessary for the hoist cable drum and dragline drum to rotate in the reverse direction and thus drive their respective torque converter output shafts and turbines in the reverse direction. As the reverse direction speed of each torque converter's output turbine increases, a reverse output torque is generated even though the control valve in the Van De Hey-type converter is closed so that the oil flow between the input impeller and the output turbine is greatly restricted.

As a result of the reverse output torque, it has been necessary in the past to provide auxiliary hydrostatic motors at the output shaft of each of the torque converters in order to overcome the reverse torque and drive the torque converters in the reverse direction to provide a "power down" capability to insure the rapid descent of the excavator bucket and to pay out the dragline to assure that the bucket can be properly placed in the excavation area.

Overcoming the reverse output torque represents energy wasted in the form of heat generated in the torque converter. Any reduction in the reverse torque characteristics of the torque converter translates into savings of energy. Moreover, if the reverse torque can be lowered, the size and weight of the auxiliary hydrostatic motors can be decreased, and perhaps the "power down" hydrostatic motor can be eliminated altogether.

SUMMARY OF THE INVENTION

It is an object of the present invention to provide a variable torque converter which converts a constant speed input to a variable forward torque output and has a low reverse torque.

More particularly, it is an object of the present invention to provide a variable torque converter having a twin valve arrangement, which, while moving from an open position to a closed position, regulates the fluid flow from the torque converter's input impeller to the torque converter's output turbine, and when in the closed position, seals off the turbine from the fluid medium within the turbine's housing.

It is a further object of the present invention to provide a variable torque converter having a single stage output turbine.

Other objects and advantages of the invention will become apparent upon reading the following detailed description and upon reference to the drawings.

BRIEF DESCRIPTION OF THE DRAWINGS

FIG. 1 is an elevational view in section of the variable torque converter of the present invention showing the torque converter's twin valve in its fully open position;

FIG. 4 is a graph showing the reverse direction output torque vs. the output turbine speed for a constant input impeller speed of 2000 revolutions per minute (rpm).

DETAILED DESCRIPTION OF THE INVENTION

Figure 3:
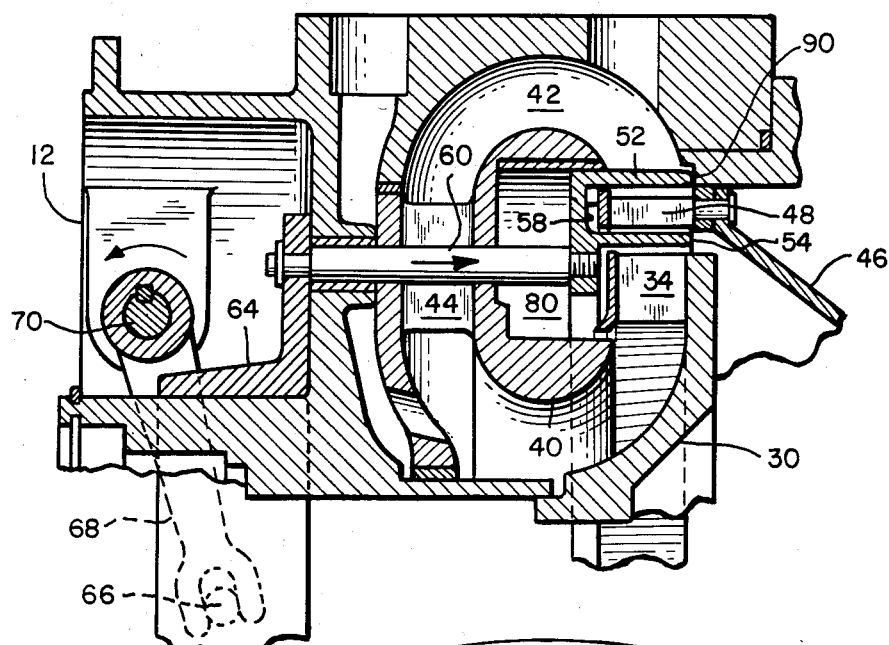
FIG. 3 is a partial sectional view of the variable torque converter shown in FIG. 1 showing the twin valve in its fully closed position.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

Turning to FIG. 1 there is shown a sectional view of a single stage, twin valve, variable torque converter 10 which embodies the present invention. The torque converter 10 includes a housing 12 containing a fluid medium, conventionally oil. An input shaft 16 is mounted in the housing 12 for rotation on bearings 18. An output shaft 20 is similarly mounted in the housing for rotation on bearings 22. The output shaft has attached to it a hub 24 which has bearings 26 for engaging the end 28 of the input shaft 16. As a result, the output and input shaft are concentrically aligned and free to rotate within the housing and independently of each other.

An input impeller 30 is keyed to input shaft 16 and is held in place by nut 32 so that the impeller 30 is fixed to and rotates with the input shaft 16. The impeller 30 includes a set of vanes (or blades) 34 evenly spaced around its periphery. The hub 36 of the impeller 30 along with housing portion 38 and core member 40 form a torroid-shaped chamber 42 within the housing 12 of the torque converter. The vanes 34 of the impeller are disposed within the right hand portion (FIG. 1) of the torroid-shaped chamber 42 and are pitched so that, when the input shaft 16 is rotated (as shown) by means of a constant speed engine (not shown), the oil is pumped radially outward by the action of the vanes of the impeller and is generally confined within the elliptical cross-sectional area of the torroid-shaped chamber 42.

Within the left hand portion (FIG. 1) of the torroid-shaped chamber 42, there is provided a set of evenly spaced stator vanes 44 which serve to direct and control the flow of the oil around the circumference of the torroid-shaped chamber. The stator vanes also support the core member 40 of the torroid-shaped chamber 42.

A turbine 46 is keyed to and rotates with the output shaft 20. The turbine 46 has single set (single stage) of vanes (or blades) 48 evenly distributed around its circumference. The turbine vanes 48 are positioned radially outward from the vanes 34 of the impeller 30 by a small distance 49. Moreover, the vanes 48 of the turbine 46 are disposed within the right hand portion (FIG. 1) of the path defined by the elliptical cross-section of the torroid-shaped chamber 42. As a result, as the oil is pumped by the action of the vanes 34 of the impeller 30 within the confines of torroid-shaped chamber 42, the impeller 30 and the turbine 46 are coupled to each other by the oil medium so that as the impeller rotates in its forward direction at a constant speed, the turbine is driven in the same forward direction.

In order to provide variable output torque for a constant input speed, there is provided a twin valve arrangement 50 which in accordance with the present invention serves to regulate the oil flow from the impeller vanes 34 to the turbine vanes 48 within the confines of the torroid-shaped chamber and thus provide a variable forward output torque. The twin valve arrangement also in accordance with the inventive concept seals off the turbine vanes from the oil flow in the torroid-shaped chamber when the valve arrangement is closed and thus provides a particularly low reverse output torque.

The twin valve 50 includes a first valve portion 52 and a second valve portion 54. The two valve portions, 52 and 54, together form two concentric cylinders or sleeves with an open end 56 and a closed end 58 where the two concentric sleeves are tied together.

In order to accommodate axial movement of the twin valve 50 from an open position to a closed position, the twin valve 50 is slidably nested within cylindrical cavity 80 in the core member 40 of the torroid-shaped chamber 42. The cavity 80 has a closed end 82 (left in FIGS. 1 and 3) and an open end 84 (right in FIGS. 1 and 3). The open end 84 is essentially closed off by rims 86 and 88 of the impeller 30 and turbine 48, respectively. Thus the flow of the oil coupling the impeller to the turbine is largely confined to the elliptical cross section of the torroid-shaped chamber 42.

The twin valve 50 is shown in its fully open position in FIG. 1 with the twin valve 50 retracted into the core's cavity 80. FIG. 3 shows the twin valve in its fully closed position with the twin valve 50 extended so that valve portion 54 extends into the small space 49 between the impeller vane 34 and the turbine vanes 48. The valve portion 54 thus cuts off flow of oil from the impeller to the turbine in the torroid-shaped chamber so that only a very small forward output torque is produced. Moreover, the valve portion 52 extends across the outside of the turbine vanes 48 and abuts the housing at 90 so that the turbine vanes 48 are essentially sealed off from the oil flow in the torroid-shaped chamber 42. As a result of sealing off the turbine vanes 48 from the oil flow in the torroid-shaped chamber 42 by means of both valve portions 52 and 54, the turbine, when rotated in reverse generates a smaller reverse torque than conventional single valve converters as will be more fully discussed below.

In this illustrated embodiment, in order to slide the twin valve between its open position (FIG. 1) and its closed position (FIG. 3), control rods 60 (one shown in FIG. 1 and all three shown in FIG. 2) are connected equidistantly around the circumference of the twin valve arrangement to provide a means for controlling the movement of the twin valve arrangement from its open position shown in FIG. 1 to its closed position shown in FIG. 3. The three control rods 60 project from the twin valve 50 through matching bores in three of the stator vanes 44 to a point outside housing 12.

Figure 2:
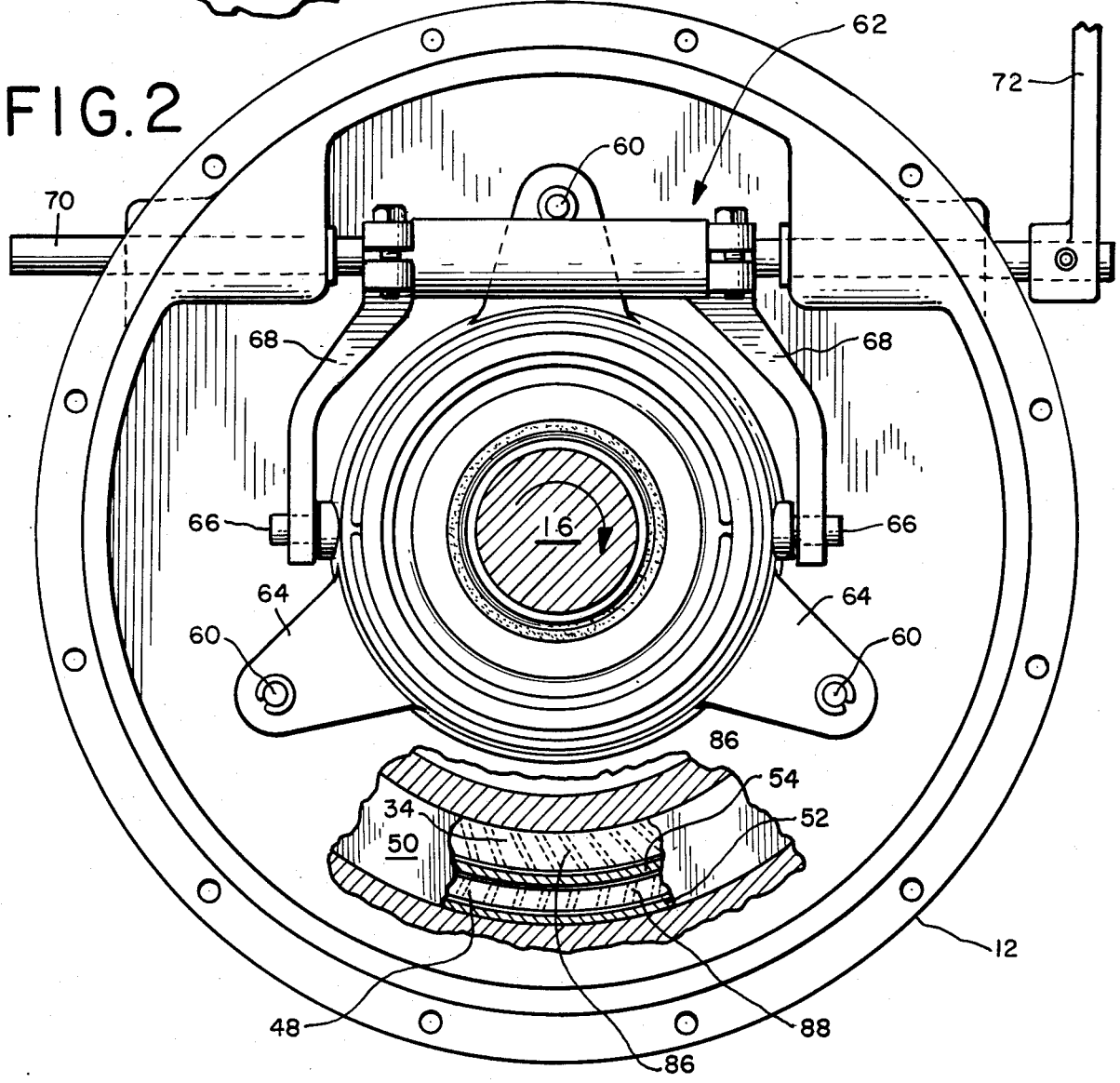
FIG. 2 is a sectional view of the torque converter of the present invention as seen along section line 2—2 of FIG. 1.

Referring to FIGS. 1 and 2, there is shown a valve control mechanism 62 which comprises a spider hub 64 slidably mounted on input shaft 16 outside of the housing 12 and connected to each of the control rods 60. Two stubs 66 are attached to each side of the spider hub 64 and are engaged by means of crank arms 68 which in turn are keyed for rotation to shaft 70. Shaft 70 is journaled in the housing 12 and is rotated by means of shift lever 72. The shift lever may be manually operated to move the twin valve 50 between its open and closed positions, or it may be operated by a remote servo mechanism.

It will be understood, of course, that other control means may be provided for opening and closing the twin valve 50, without departing from the present invention.

Operation of the single stage, twin valve, variable torque converter is best understood by reference to FIG. 4. FIG. 4 shows the reverse output torque as a function of output speed with a constant forward input speed of 2000 rpm for three types of torque converters. The first curve 100 is for the three stage, single valve, torque converter of the Van De Hey-type with a single valve portion interposed between the vanes of the impeller and the first stage of the three stage turbine. The three sets of turbine vanes (3 stages) rotate in the oil medium during reverse rotation and a substantial reverse torque builds up reaching approximately 600 ft.-lbs. at a reverse rotational speed of 2000 rpm. In fact although the converter shows a relatively low reverse torque at low reverse speeds, the curve 100 shows an almost exponential increase in reverse torque as reverse speed increases.

The second curve 200 is for a single stage, single valve, torque converter (the Van De Hey single valve portion and only one set of turbine vanes). The single stage, single valve converter also produced a substantial reverse torque of nearly 500 ft.-lbs. at 2000 rpm reverse speed.

The reverse torque performance of the single stage, twin valve, torque converter of the present invention is shown by curve 300. The single stage, twin valve converter provided the best reverse torque characteristics reaching less than 300 ft.-lbs. at 2000 rpm. Moreover, the single stage, twin valve, converter exhibited a nearly linear relationship.

In view of the foregoing, it can be seen that the present invention provides a single stage, twin valve variable torque converter which converts a constant speed input to a variable forward output torque and has a low reverse output torque.

I claim as my invention:

1. A torque converter comprising
   a. a housing for containing a fluid medium and having a generally torroid-shaped chamber formed therein for providing a defined fluid flow path;
   b. an input shaft mounted in the housing with a vaned impeller attached thereto for rotation therewith, the impeller having its vanes disposed within the fluid flow path of the torroid-shaped chamber,
   c. an output shaft mounted in the housing with a vaned turbine attached thereto for rotation therewith, the turbine having a single set of vanes disposed within the fluid flow path of the torroid-shaped chamber so that the turbine and impeller are coupled by means of the fluid medium; and
   d. means for regulating fluid flow from the impeller to the turbine within the torroid-shaped chamber and for completely sealing off the turbine from the fluid medium in the torroid-shaped chamber including a twin valve arrangement including a first cylindrical sleeve portion and a second cylindrical sleeve portion that are radially joined together in concentric relation and positioned for simultaneous axial movement into and out of the torroid-shaped chamber with the first sleeve portion movable axially into and out of a space between the vaned impeller and the vaned turbine and the second sleeve portion movable axially into and out of an area adjacent to and radially outward from the vaned turbine, the second sleeve portion in its outer axial position extending across the outside of the turbine vanes and abutting the housing whereby the turbine vanes are essentially sealed off from the oil flow in the torroid-shaped chamber so that for a constant input shaft speed a variable forward direction output torque is provided and a reduced reverse direction output torque is achieved depending on the axial position of the twin valve arrangement.

2. The torque converter of claim 1 wherein the means for regulating the fluid flow and for sealing off the turbine includes an axially movable spider hub and a plurality of control rods connected to the twin valve arrangement.

3. The torque converter of claim 2 wherein the torroid-shaped chamber has a center core supported by stator vanes, the twin valve arrangement is nested in a cavity within the core and the control rods connected to the twin valve pass through bores in the stator vanes to a point outside the housing.

* * * * *